United States Patent [19]
Cambell et al.

[11] Patent Number: 4,528,276
[45] Date of Patent: Jul. 9, 1985

[54] ZEOLITE ION EXCHANGER FOR BUILDERS IN DETERGENTS

[75] Inventors: Thomas C. Cambell, Huntington Beach, Calif.; Howard S. Sherry, Cherry Hill, N.J.; George C. Schweiker, Ardmore; James S. Falcone, Jr., Devon, both of Pa.; Robert H. Sams, deceased, late of Alden, Pa., by Ruth W. Sams, Legal Representative

[73] Assignee: PQ Corporation, Valley Forge, Pa.

[21] Appl. No.: 455,151

[22] Filed: Jan. 3, 1983

Related U.S. Application Data

[63] Continuation-in-part of Ser. No. 322,790, Nov. 19, 1981, abandoned, and a continuation of Ser. No. 152,897, May 23, 1980, abandoned, which is a continuation-in-part of Ser. No. 49,259, Jun. 18, 1979, abandoned.

[51] Int. Cl.$^3$ .......................... B01J 20/18; B01J 20/22
[52] U.S. Cl. ........................................ 502/62; 502/64; 502/69; 252/135
[58] Field of Search ............................ 502/64, 69, 62; 252/135

[56] References Cited

U.S. PATENT DOCUMENTS

| 2,973,327 | 2/1961 | Mitchell et al. | 252/455 Z |
|---|---|---|---|
| 3,055,841 | 9/1962 | Gladrow et al. | 252/455 Z |
| 3,262,890 | 7/1966 | Mitchell et al. | 502/68 |
| 3,687,640 | 8/1972 | Sams et al. | 23/313 |
| 4,096,081 | 6/1978 | Phenicie et al. | 252/135 X |
| 4,243,544 | 1/1981 | Taylor | 252/135 |
| 4,248,847 | 2/1981 | Derleth et al. | 252/135 X |
| 4,406,808 | 9/1983 | Gangwisch et al. | 252/135 X |

FOREIGN PATENT DOCUMENTS 2736903  2/1978  Fed. Rep. of Germany .................. 252/174.25

Primary Examiner—Carl F. Dees
Attorney, Agent, or Firm—Ernest G. Posner; J. S. Stephen Bobb; Fred C. Philpitt

[57] ABSTRACT

Alkali metal silicates and zeolites can be agglomerated to form granules that are of particular value in detergents. These agglomerates are formed when hydrated alkali metal silicate particles are tumbled with hydrated zeolites of small particle size while moisture and then heat are introduced to achieve granulation. The product is a free-flowing granular material has numerous desirable characteristics for detergents.

18 Claims, No Drawings

ZEOLITE ION EXCHANGER FOR BUILDERS IN DETERGENTS

RELATED PATENT APPLICATIONS

This application is a continuation in part of our co-pending patent application Ser. No. 322,790, filed Nov. 19, 1981 and now abandoned; said application being a continuation of our application Ser. No. 152,897, filed on May 23, 1980, and now abandoned. Application Ser. No. 152,897 was in turn a continuation in part of our application Ser. No. 49,259, filed on June 18, 1979 and now abandoned.

BACKGROUND OF THE INVENTION

This application relates to crystalline aluminosilicates, commonly called zeolites, and used as builders in formulated detergents. In particular, our invention comprises a zeolite-alkali metal silicate composite that disintegrates in aqueous media, allowing the zeolite to disperse rapidly in said aqueous media.

Zeolites (crystalline or partially crystalline alkali metal aluminosilicates) have been used to replace or partially replace phosphates in built laundry detergents as described in U.S. Pat. Nos. 3,985,669; 4,000,094; 4,019,999 and 4,096,081. The prior art section of Patent 4,096,081 describes many of the problems associated with the use of zeolites as builders in detergents. Some of these problems are: (1) zeolite built detergents cannot be formulated with sufficient alkali metal silicate to realize the desirable detersive properties of the silicate; (2) zeolites of the proper particle size for detergent builders are free-flowing, but present a severe dusting problem when being handled; (3) high density and small particle size materials such as zeolites and silicates tend to segregate from dry blended mixtures upon handling and storage. The solution to these problems offered by this prior art patent is to prepare granules containing the aluminosilicate builder separately from the portion of the detergent containing the soluble silicate. The teachings of this patent further indicate that even in an agglomerate there is an undesirable "polymerization" of the zeolite when the silicate is present in the agglomerate.

The considerable body of prior art directed to the use of zeolites as detergent builders all indicates that the ion exchange capacity of the zeolite for calcium must be high and that the dispersion of the zeolite throughout the wash water must not be impeded in any way. It is therefore imperative that any agglomerate involving zeolite builder must disintegrate in such a manner that the zeolite can disperse in the wash water as quickly as possible upon exposure to the aqueous medium.

SUMMARY OF THE INVENTION

Agglomerates that combine separate particles of hydrated zeolite and hydrated alkali metal silicate are found to have the desired property of disintegrating upon exposure to an aqueous environment. The quick disintegration of these agglomerates and dispersion of the zeolite with subsequent removal of hardness ions from the wash water make these materials desirable components in formulating detergents. The agglomerates are prepared by adding moisture and then heating a tumbling mixture of zeolite and silicate. Usually Zeolite NaA and sodium silicate are used. Tumbling is continued after moisture addition and heating have induced agglomeration, to consolidate and stabilize the particles. Screening and drying to remove most of the added moisture complete prepartion of the granules.

The starting materials are of small particle size and are only marginally compatible with other detergent ingredients in dry-blended detergent formulations. The product granules are of considerably larger particle size and lower density, which are desirable properties for the proposed use. Our granules also exhibit relatively small differences between the tamped and untamped bulk densities, which is a desirable characteristic of detergent ingredients. The product is also capable of absorbing a significant level of compatible liquids, especially nonionic surfactants. Most importantly, our particles disintegrate and the zeolite disperses readily in water to provide high and very fast ion exchange capability.

The prior art consistently indicates that zeolites and silicates, when combined in the same granule or particle, interact to form materials that do not disintegrate and promote dispersal of the zeolite. The teachings of the prior art indicate that this condition persists even when other materials that can be considered to be dispersing agents are included in the granule or particle. Contrary to these teachings, our agglomerates which combine separate particles of zeolite and silicate disintegrate within 15 seconds of exposure to an aqueous bath, and the zeolite is dispersed throughout the bath to consume the hardness ions that the bath contains.

THE INVENTION

The alkali metal silicate powders or particles required as a raw material for the agglomerates of our invention may be obtained by spray drying, fluid bed drying or other equivalent method of drying sodium and/or potassium silicate solutions. Spray drying is usually preferred because this process produces large quantities of relatively dense, small particles that are suitable for our process at reasonable cost. The $SiO_2/M_2O$ mole ratio can be 1.4 to 4.0, wherein M stands for sodium, potassium or a combination thereof. We prefer to use sodium silicate that has 1.6 to 2.8 moles of $SiO_2$ per mole of $Na_2O$. We most prefer a sodium silicate that contains 1.8 to 2.4 moles of $SiO_2$ per mole of $Na_2O$. We have found that the composition of the silicate is important to the disintegration of our agglomerate in water and dispersion of the zeolite. If the silicate is too siliceous it will not dissolve rapidly to disintegrate the agglomerate properly. The silicate must also contain sufficient silica to aid in dispersion of the zeolite.

The moisture content of the starting silicate particles is important and should be above about 15%. We prefer that the water content of the silicate particles be between 15 and 30%.

A variety of synthetic and natural zeolites are useful as the second ingredient in our composition. We prefer synthetic zeolites since they can be prepared with the exact combination of properties desired. Sodium aluminosilicates such as those described in U.S. Pat. Nos. 2,882,243-4; 3,012,853; 3,130,007; 3,329,628; 3,720,756 and 3,802,326 among others are useful.

We usually use a zeolite that conforms to the formula:

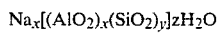

$$Na_x[(AlO_2)_x(SiO_2)_y]zH_2O$$

In this formula, x and y are integers; the molar ratio of x to y is in the range of 0.1 to 1.1 and z is an integer from about 8 to 250. In general, z is an integer such that the water content is between about 20 and 30% by weight of the zeolite. We prefer to use Zeolite NaA wherein x and y are 12 and z is about 20. Another useful zeolite has a composition wherein x is an integer between 80 and 96, y is an integer between 112 and 96, and z is between 220 and 270 representing a water content of about 18 to 30%.

Zeolite NaA is the preferred starting ion exchange material. Mixtures of Zeolite NaA and Zeolite NaX are also preferred. It is important that this material be hydrated. A loss on ignition (LOI) of 19 to 25% by weight satisfies this requirement. The particle size of the Zeolite NaA should be less than 10 microns. We prefer a particle size of 2 to 6 microns.

While we have found that as little as 1 part by weight of silicate per 10 pbw of zeolite will form granular products, the features of our composition are not realized unless at least about 1 pbw of the hydrated silicate is present for each 8 pbw of the hydrated zeolite. If less of the silicate is present the disintegration of the product in water is reduced and the rate of calcium exchange may be slower than desired. The relative proportions of zeolite to silicate also appear to influence the amount of nonionic surfactant that the product will adsorb. Granules comprising 2 to 6 pbw of zeolite per 1 pbw of silicate absorb nonionic surfactant efficiently. We prefer 3 to 6 pbw of zeolite per 1 pbw of silicate which provides granules of the highest adsorptivity for nonionics and granules that disintegrate as desired. Granules that can take up such surfactants and remain free-flowing are very useful as detergent components.

The separate particulate components of our agglomerates can be blended in any convenient manner, but are usually tumbled in a drum or other revolving cylindrical container. After a uniform mixture of the particles is achieved, tumbling is continued during moisture addition and heating. We define tumbling as keeping the mixture loose and in motion. Maintaining said loose character often requires mechanical assistance to overcome the physical characteristics of the particule mixture, particularly during addition of moisture which must be distributed uniformly throughout the mixture. After moisture is added and any lumps have been eliminated, tumbling during heat application facilitates heat transfer and further moisture redistribution. Tumbling of this type requires that the particles be freely in motion without forcing or preventing contact between the particles. The motion causes repeated collisions and rolling among the particles so that as the silicate particles develop adherent surfaces, the particles stick together and eventually form into granules having survival strength. Finally, tumbling during cooling keeps the agglomerates freely in motion until any adherent character is lost by recooling and moisture dissipation.

Tumbling of the desired nature may be obtained using revolving drum, pan, sphere or tube. For instance, a closed metal or plastic container might be partially filled with the dampened particle mixture and rotated horizontally while being heated externally with gas burners, hot air, heat lamps or by being submerged in a bath of heat transfer liquid. Lifts can be attached to the drum wall to facilitate tumbling, and the drum can be designed to eliminate interior corners, or provided with knockers, to free or minimize material lodging where it could consolidate as chunks rather than free-flowing granules. An open or continuous system of a similar nature can consist of a slightly inclined pipe or tube either rotating with lifts or non-rotating with an internal screw to lift, tumble and convey through dampening, warming, shaping, recooling and redrying zones.

Although both particulate materials are hydrated, additional water is required to initiate agglomeration. The particle mixture must be dampened with sufficient water to initiate granulation in order to produce the desired product from the subsequent heating step. While the amount of water required will vary according to the composition of the particle mixture and the raw materials, the effective range of water addition is surprisingly narrow. Water additions of 15 to 35 pbw per 100 pbw of particle mixture are effective, and we prefer to use 16 to 30 pbw of water per 100 pbw of particle mixture. Less water reduces the yield of desirable granules while more water increases the density of the product to an unsatisfactory level. The water can be introduced into the tumbling material by various means such as vapor from steam jets, water from a fine sprayer, sparger pipes or an intensifier bar and distributed throughout the mixture before heating begins. The dampened mixture is tumbled until agglomeration begins. The partially agglomerated material is passed through a relatively large screen (larger particles are grated through the screen) before the heating step. This screening helps prevent the formation of very large agglomerates.

The now partially agglomerated particle mixture is tumbled as previously described in a closed container. The heat is applied to the particles indirectly through the walls of the container which are heated in any convenient manner; the tumbling action serves to distribute heat throughout the mixture. The heating rate, the maximum temperature attained, the holding time at the maximum temperature and the rate of cooling depend upon the composition of the mixture and the characteristics desired in the final product. We obtain the product characteristics we desire by heating the particle mixture to a maximum temperature of 80° to 130° C. at a rate of 4° to 15° C. per minute. The maximum temperature can be held 0 to 30 minutes while the agglomerates are cooled at 5° to 15° C./minute.

The agglomerates are screened; the oversized materials are ground while the fines may be removed and recycled with the crushed oversized material to a fresh particle mixture. The fine material can also remain with the agglomerated material because further agglomeration may occur in the redrying step. The desired fraction is then dried by tumbling and heating the agglomerates. At least 70% of the moisture added to the particle mixture should be removed; we prefer to remove 80% or more of the water added. Redrying serves to enhance the free-flowing character of the product, and may increase its capacity to absorb liquid ingredients. Ordinarily, the drying step should not remove more water than was used in the agglomeration step unless the product is to be used for some purpose other than as a builder for detergents. If too much water is removed, dissolution of the silicate is retarded and disintegration of the agglomerate is diminished. The material is screened again to remove any oversize materials that might form during the redrying step as well as any remaining fines to be recycled.

The mechanism by which our agglomerate forms can be summarized as follows. The action of the added moisture and heat is to soften the surfaces of the alkali metal silicate by partial hydration. The softening surfaces become adherent to the zeolite particles, and granules are formed. As tumbling continues, the granules become somewhat rounded and compacted. Finally, as tumbling continues and as the surfaces lose their adherent character through recooling and moisture dissipation, a free-flowing granular product is realized.

We prefer our product to have particles in the range of about 150 to 2000 microns. The bulk density of detergent components is very important. Our product has an untamped bulk density of about 0.30 to about 0.70 g/cm$^3$ and a tamped bulk density of about 0.33 to about 0.75 g/cm$^3$; these values are acceptable for detergent components. The relationship between the tamped and untamped bulk density is an important property, and the difference between the two values should be as small as possible. Our product has a less than 15%, usually less than 10%, difference between these two values. To effectively ion exchange the hardness (Ca$^{++}$ and Mg$^{++}$) present in wash water, the zeolite must be dispersed throughout the wash water quickly. Our agglomerates achieve this because they disintegrate in water and the silicate acts as a dispersing agent. Our product granules disintegrate completely in cool water, and the zeolite is dispersed so that it cannot be visually discerned within 15 seconds upon exposure to cool water. This time is very fast when compared to an accepted commercial laundry product containing zeolite which requires several minutes for the particles to become dispersed.

The absorption of nonionic surfactants is a very important property of our product and of detergent components. Our agglomerates absorb up to 50% by weight of nonionic surfactants and remain free-flowing. The actual amount of nonionic that our product can absorb varies with the viscosity of the surfactant; the more viscous materials are absorbed to a greater extent than the more fluid materials. The composition of our granules has a very large influence on the amount of surfactant absorbed. Granules that contain 1 pbw of zeolite per 1 pbw of silicate absorb up to 25% of the surfactant. Granules of 2 and 4 pbw of zeolites per pbw of silicate absorb a minimum of 20% and a maximum of 30% by weight of the nonionic, respectively.

The product contains less than 5% water not originally associated with the zeolite or the silicate. Another very important property of our agglomerate is its calcium exchange capacity. It appears that the association of the zeolite and silicate in our product does not inhibit the calcium exchange capacity of the zeolite so that nearly the theoretical capacity of the zeolite is achieved.

The zeolite-silicate agglomerate of our invention is useful for any applications that involve the combination. The product is most useful in formulating dry-blended laundry detergents. Our zeolite silicate agglomerate can constitute 15 to 65% of said detergent.

EXAMPLES

The following examples illustrate certain embodiments of our invention. These examples are not presented to establish the scope of the invention, which is fully disclosed in the disclosure and the claims. The proportions are in parts by weight (pbw) or percent by weight (%) unless otherwise indicated. The raw materials used in the examples were:

BRITESIL ®C24 hydrous sodium silicate
  2.40 SiO$_2$/1.0Na$_2$O; 23.8% Na$_2$O;
  57.2% SiO$_2$; 19.0% H$_2$O
Zeolite NaA containing 21% H$_2$O

EXAMPLE 1

This example illustrates the preparation of an agglomerated product containing 2 pbw of Zeolite NaA and 1 pbw of silicate.

BRITESIL C24 (100 pbw) and the Zeolite NaA (200 pbw) were blended by mechanically assisted tumbling in an open container tilted at 45° from the horizontal. Tumbling was continued while 48 pbw of water was sprayed onto the mixture. Agglomeration was initiated by the water addition. The dampened mixture was screened so that it would pass though a 20-mesh screen. The screened material was transferred to a closed cylinder with tubular lifts that encourage tumbling action during horizontal rotation. The cylinder was rotated at 30 rpm and heated from 21° C. to a 100° C. interior space temperature in 9 minutes. The interior temperature was then reduced to 35° C. in 10 minutes as rotating continued. The agglomerated material was discharged from the closed container and screened. The desired 10 to 65 mesh fraction was placed in an open container and tumbled while heating gently to remove 80% of the water added to initiate the agglomeration. A yield of about 65% of the desired 10 to 65 mesh product was obtained. The untamped bulk density was 32.1 lb/cu.ft. while the tamped value was 36.9 lb/cu.ft. Scanning electron micrographs show the Zeolite NaA particles to be coated on the relatively larger silicate particles; both types of materials were finer than about 65 mesh before agglomeration.

EXAMPLE 2

This example illustrates the preparation of an agglomerate containing 1 pbw of Zeolite NaA and 1 pbw of the silicate.

The zeolite (100 pbw) was tumbled and 32 pbw of water was sprayed onto it. After the zeolite had become completely and uniformly dampened, 100 pbw of BRITESIL was added quickly. Tumbling was continued until granulation was observed. The mixture was screened and the less than 20-mesh material placed in the closed container. The container was heated to 105° C. in 6 minutes before recooling to 35° C. in 10 minutes. The preparation was completed as described in Example 1. Untamped and tamped bulk densities were 41.8 and 46.9 lb/cu.ft., respectively.

EXAMPLE 3

This example illustrates a second preparation of an agglomerate containing 2 pbw of Zeolite NaA and 1 pbw of silicate. The preparation resulted in a greater yield of the desired particle size material of a lower bulk density.

The zeolite (200 pbw) was tumbled in the open container while 48 pbw of water was sprayed onto the powder. After the moisture was distributed uniformly, 100 pbw of the BRITESIL was added quickly to the tumbling material. Tumbling was continued until agglomeration was noticed, about 10 minutes. The loosely agglomerated material was passed through a 10-mesh screen and the smaller than 10-mesh material placed in a drum that was at least 3 times the volume of the mixture. The drum had tubular lifts and was rotated at 30 rpm to produce the desired tumbling action. The sealed drum was heated to 100° C. in 5 minutes and recooled to 35° C. in 10 minutes. The agglomerated material was then heated in an open container while tumbling gently to evaporate 80% of the moisture added to initiate agglomeration. The material was screened, and 88% of the product was found to be in the desirable range of 10 to 65 mesh with untamped and tamped bulk densities of 30.1 and 35.4 lb/cu.ft, respectively.

EXAMPLE 4

A preparation was run exactly as described in Example 3, except that only 43.5 pbw of water was used instead of 48 pbw. The yield of 10 to 65 mesh product was reduced to 63%.

EXAMPLE 5

The preparation was carried out exactly as described in Example 3, except that 52.5 pbw of water was used instead of 48 pbw. The yield of the desired sized material was about the same as in Example 3, but the bulk density was increased by about ⅓.

EXAMPLE 6

This example illustrates the process of preparing an agglomerate that contains 4 pbw of Zeolite NaA and 1 pbw of silicate. Zeolite NaA (400 pbw) and BRITESIL C24 (100 pbw) were tumbled until uniformly mixed. Then 100 pbw of water was sprayed onto the mixture and tumbling was continued until some agglomeration was observed. The dampened mixture was passed through a 14-mesh screen and placed in the heating drum. The rotating drum was heated to 100° C. in 8 minutes and recooled to 35° C. in 10 minutes. The agglomerated material was dried as previously described, to remove about 80% of the added moisture. The material was screened to provide the 10 to 80 mesh fraction. The untamped and tamped bulk densities were 40.2 and 45.4 lb/cu.ft., respectively.

EXAMPLE 7

The absorption of nonionic surfactants by the products of our invention and the precursor materials was tested. A simple spotting test, i.e., a surfactant transfer test, was developed in order to determine the absorption capability of our zeolite-silicate agglomerates. Five grams of the test agglomerates were weighed into an appropriate container at room temperature. A carefully weighed quantity of surfactant, heated to 50° C., was added to the granules. The mixture was agitated gently for 60 seconds using a spatula; then the mixture was placed in a compact heap on a piece of white paper. The test material remained in contact with the paper for 3 minutes and was then returned to the container, which was then sealed. The test was repeated after 60 minutes and after about 24 hours. The material was stored at room temperature (20°–22° C.) during this time. Each surfactant was tested with the granules by preparing a series of samples with increased surfactant levels from one sample to the next; e.g., 25%, 30%, 35%, 40%, etc. added surfactant. "Saturation" was considered to be that level at which the 24-hour sample produced distinct spotting. To facilitate observation of the spotting, a small amount of red dye was added to the sufactant (1 g of 0.5% solution of Rhodamine Bx in isopropanol added to 25 g of the surfactant). The isopropanol does not influence the test, since it evaporates during sample preparation.

At add-on levels below "saturation," spotting sometimes occurs immediately after the test specimens are prepared; the spotting is more pronounced at levels close to "saturation."

The surfactants used in this test were nonionic ethoxylated linear alcohols supplied by Shell Chemical Co. under the trademark NEODOL ®. The surfactants used were:

NEODOL 25-7: A nonionic surfactant consisting of an ethoxylated linear alcohol of $C_{12}$, $C_{13}$, $C_{14}$ and $C_{15}$ chain lengths with 7.2 ethylene oxide groups per mole of alcohol. The molecular weight is over 500, and the melting point is 18°–20° C.

NEODOL 25-9: A similar nonionic with 9 ethylene oxide groups per mole of alcohol, a molecular weight over 600 and a melting point of 25°–28° C.

NEODOL 25-12: A similar nonionic with 12 ethylene oxide groups per mole of alcohol, a molecular weight of more than 700 and a melting point of 30°–33° C.

NEODOL 45-7: A nonionic surfactant consisting of an ethoxylated linear alcohol of $C_{14}$ and $C_{15}$ chain lengths with 7 ethylene oxide groups per average mole of alcohol. The molecular weight is over 500 and the melting point is 21°–25° C.

Table 1 summarizes the maximum surfactant loadings (maximum without spotting) for examples of our agglomerate.

TABLE 1

| Maximum Surfactant Loading on Composites | NEODOL | | | |
|---|---|---|---|---|
| | 25-7 | 25-9 | 25-12 | 45-7 |
| Agglomerated BRITESIL C24 Silicate; No Example | 15% | 20% | 50% | 15% |
| 1:1 Zeolite-Silicate Composite; Example 2 | 10% | 15% | 25% | 10% |
| 2:1 Zeolite-Silicate Composite; Example 1 | 15% | 15% | 40% | 10% |
| 4:1 Zeolite-Silicate Composite; Example 6 | 30% | 35% | 50% | 25% |
| 10:1 Zeolite-Silicate Composite; No Example | — | 40% | 40% | — |

These results indicate that the agglomerates containing 4 pbw of Zeolite NaA per pbw of silicate are more efficient adsorbents for these surfactants.

EXAMPLE 8

The flow characteristics of detergent components are very important properties. We tested the flowability of our granules and one commercial product as follows. A carefully weighed one-ounce sample was placed in a 1.5-oz polyethylene funnel (7 mm i.d. stem). The material was timed for complete emptying of the funnel. An average time for five runs was reported. The results are summarized in Table 2.

TABLE 2

| Flowability Test | |
|---|---|
| | Seconds |
| Commercial Detergent Formulation | 3.1 |
| 2:1 Zeolite-Silicate | 3.5 |
| 2:1 Zeolite-Silicate with post-added NEODOL 45-13 at: | |
| 15% | 3.1 |
| 20% | 3.4 |
| 25% | 3.8 |
| 30% | 4.3 |
| 35% | cakey |
| with post-added NEODOL 45-11 at: | |
| 30% | 3.5 |
| 4:1 Zeolite-Silicate | 3.5 |
| 4:1 Zeolite-Silicate with post-added NEODOL 45-13 at: | |

TABLE 2-continued

| Flowability Test | |
|---|---|
| | Seconds |
| 30% | 3.5 |
| 40% | 3.6 |
| 10:1 Zeolite-Silicate | 2.5 |
| 10:1 Zeolite-Silicate with post-added: | |
| NEODOL 25-9 at 35% | 2.7 |
| NEODOL 25-12 at 35% | 2.8 |
| NEODOL 45-11 at 35% | 2.9 |
| NEODOL 45-13 at 35% | 3.1 |

A second series of flowability tests were carried out using surfactant NEODOL 25-7. The results are summarized in Table 3.

TABLE 3

| Flowability Test | |
|---|---|
| | Seconds |
| Commercial Detergent Formulation | 3.1 |
| 2:1 Zeolite-Silicate | 3.4 |
| 2:1 Zeolite-Silicate with post-added NEODOL 25-7 at: | |
| 12.5% | 3.8 |
| 20.0% | 3.2 |
| 25.0% | 3.3 |
| 4:1 Zeolite-Silicate | 2.8 |
| 4:1 Zeolite-Silicate with post-added NEODOL 25-7 at | |
| 20.0% | 2.7 |
| 25.0% | 2.7 |
| 30.0% | 2.7 |
| 35.0% | 2.9 |
| 40.0% | cakey |

The results indicate that the agglomerates of our invention have good flow characteristics even when loaded with substantial amounts of surfactant. At "saturation" levels of surfactant loadings the granules cake and do not flow.

EXAMPLE 9

Quick and complete dispersibility of the zeolite in our agglomerate is very important to provide optimum detergency performance. Dispersibility was evaluated in a subjective manner by dropping about 0.1 g of the test material into about 50 ml of de-ionized water at room temperature. No agitation was provided. Suddenly, a cloudy white layer forms around the solids. The time at which this layer forms is considered the time of dispersion, since the agglomerates completely break up and disperse with gentle swirling upon formation of the cloudy layer. The following tabulation shows the "dispersion time" range for several determinations for our product.

| 2 pbw Zeolite NaA:1 pbw silicate (Example 1) | 4–15 seconds |
|---|---|
| 4 pbw Zeolite NaA:1 pbw silicate (Example 6) | 7–15 seconds |
| 10 pbw Zeolite NaA:1 pbw silicate | 180 seconds |

It is apparent that the 2:1 and 4:1 granules are far superior to the 10:1 material in speed of dispersion and results in superior performance. A commercial laundry detergent was found to be poorly dispersible, taking more than several minutes to disperse.

A further series of dispersibility tests was carried out incorporating composites that had been combined with liquid nonionic surfactant NEODOL 25-7. The following results show the dispersion times for several such determinations.

| 2 pbw Zeolite NaA:1 pbw silicate | 7 seconds |
|---|---|
| +12.5% surfactant | 15–25 seconds |
| +20.0% surfactant | 10–35 seconds |
| +22.5% surfactant | 30–50 seconds |
| 2 pbw Zeolite NaA:1 pbw silicate | 3 seconds |
| +25.0% surfactant | 10–30 seconds |
| +27.5% surfactant | 15–25 seconds |

We claim:

1. An agglomerate that is a combination of separate particles of alkali metal silicate and zeolite and consists of 1 part by weight (pbw) of water-soluble alkali metal silicate particles and 1 to 8 pbw of water insoluble hydrated zeolite particles, said agglomerate being characterized by: (a) disintegrating when exposed to water, thereby dispersing the insoluble zeolite throughout the water; (b) a particle size of 150 to 2000 microns; and (c) less than a 15% difference between the bulk density and tamped bulk density, said alkali metal silicate particles having 1.4 to 4.0 moles of $SiO_2$ per mole of $M_2O$, where M represents sodium, potassium or a mixture thereof and 15 to 30% by weight water, and said zeolite having the formula:

$$Na_x[(AlO_2)_x(SiO_2)_y]zH_2O$$

wherein x and y are integers and the molar ratio of x to y is in the range of 0.1 to 1.1 and z is an integer such that the water content of said zeolite is about 18 to 30%.

2. The agglomerate of claim 1 wherein the silicate is sodium silicate with 1.6 to 2.8 moles of $SiO_2$ per mole of $Na_2O$ and the zeolite is Zeolite NaA wherein x and y are 12 and z is an integer such that the zeolite contains 19 to 25% water and said agglomerate disintegrates when exposed to water in 15 seconds or less.

3. The agglomerate of claim 2 wherein there are 2 to 6 pbw of Zeolite NaA for each pbw of hydrated sodium silicate.

4. The agglomerate of claim 3 wherein there are 3 to 6 pbw of Zeolite NaA for each pbw of hydrated sodium silicate.

5. The agglomerate of claim 2 wherein there is about 1 pbw of Zeolite NaA for each pbw hydrated sodium silicate and the agglomerate absorbs up to 25% by weight liquid nonionic surfactant.

6. The agglomerate of claim 2 wherein there are 2 to 4 pbw of Zeolite NaA for each pbw of hydrated sodium silicate and said agglomerate absorbs 40 to 50% by weight of liquid nonionic surfactant.

7. An agglomerate that is a combination of separate particles of alkali metal silicates and zeolite and consists of 1 pbw of water-soluble sodium silicate particles and 2 to 6 pbw of water-insoluble Zeolite NaA, said agglomerate being characterized by: (a) disintegrating in 15 seconds or less when exposed to water, thereby dispersing the insoluble zeolite throughout the water; (b) a particle size of 150 to 2000 microns; and (c) less than a 15% difference between the bulk density and the tamped bulk density, said hydrated sodium silicate particles having 1.6 to 2.8 moles of $SiO_2$ per mole of $Na_2O$ and 15 to 30% by weight, and said Zeolite NaA containing 19 to 25% water.

8. The agglomerate of claim 7 wherein there are 3 to 6 pbw of Zeolite NaA for each pbw of hydrated sodium silicate.

9. The agglomerate of claim 8 wherein there are 2 to 4 pbw of Zeolite Na for each pbw of hydrated sodium silicate and the agglomerate absorbs 40 to 50% liquid nonionic surfactant.

10. An agglomerate that is a combination of separate particles of alkali metal silicate and zeolite and consists of 1 part by weight (pbw) of water-soluble alkali metal silicate particles and 1 to 8 pbw of water insoluble hydrated zeolite particles, said agglomerate being characterized by: (a) said water insoluble zeolite particles being coated on the water soluble alkali metal silicate particles; (b) disintegrating when exposed to water, thereby dispersing the insoluble zeolite throughout the water; (c) a particle size of 150 to 2000 microns; and (d) less than a 15% difference between the bulk density and tamped bulk density, said alkali metal silicate particles having 1.4 to 4.0 moles of $SiO_2$ per mole of $M_2O$, where M represents sodium, potassium or a mixture thereof and 15 to 30% by weight water, and said zeolite having the formula:

$$Na_x[(AlO_2)_x(SiO_2)_y]zH_2O$$

wherein x and y are integers and the molar ratio of x to y is in the range of 0.1 to 1.1 and z is an integer such that the water content of said zeolite is about 18 to 30%.

11. The agglomerate of claim 10 wherein the silicate is sodium silicate with 1.6 to 2.8 moles of $SiO_2$ per mole of $Na_2O$ and the zeolite is Zeolite NaA wherein x and y are 12 and z is an integer such that the zeolite contains 19 to 25% water and said agglomerate disintegrates when exposed to water in 15 seconds or less.

12. The agglomerate of claim 10 wherein there are 2 to 6 pbw of Zeolite NaA for each pbw of hydrated sodium silicate.

13. The agglomerate of claim 12 wherein there are 3 to 6 pbw of Zeolite NaA for each pbw of hydrated sodium silicate.

14. The agglomerate of claim 11 wherein there is about 1 pbw of Zeolite NaA for each pbw hydrated sodium silicate and the agglomerate absorbs up to 25% by weight liquid nonionic surfactant.

15. The agglomerate of claim 11 wherein there are 2 to 4 pbw of Zeolite NaA for each pbw of hydrated sodium silicate and said agglomerate absorbs 40 to 50% by weight of liquid nonionic surfactant.

16. An agglomerate that is a combination of separate particles of alkali metal silicate and zeolite and consists of 1 pbw of water-soluble sodium silicate particles and 2 to 6 pbw of water-insoluble Zeolite NaA, said agglomerate being characterized by: (a) said water-insoluble Zeolite Na particles being coated on the water-soluble sodium silicate particles; (b) disintegrating in 15 seconds or less when exposed to water, thereby dispersing the insoluble zeolite throughout the water; (c) a particle size of 150 to 2000 microns; and (d) less than a 15% difference between the bulk density and the tamped bulk density, said hydrated sodium silicate particles having 1.6 to 2.8 moles of $SiO_2$ per mole of $Na_2O$ and 15 to 30% by weight, and said Zeolite NaA containing 19 to 25% water.

17. The agglomerate of claim 16 wherein there are 3 to 6 pbw of Zeolite NaA for each pbw of hydrated sodium silicate.

18. The agglomerate of claim 17 wherein there are 2 to 4 pbw of Zeolite Na for each pbw of hydrated sodium silicate and the agglomerate absorbs 40 to 50% liquid nonionic surfactant.

* * * * *